US009673856B1

(12) United States Patent
Thubert et al.

(10) Patent No.: US 9,673,856 B1
(45) Date of Patent: Jun. 6, 2017

(54) HIDDEN CHANNEL HOPPING SEQUENCE BASED ON SWAPPING SEQUENCE OFFSETS USING ALLOCATED SWAPPING SCHEDULE

(71) Applicant: Cisco Technology, Inc., San Jose, CA (US)

(72) Inventors: Pascal Thubert, La Colle sur Loup (FR); Patrick Wetterwald, Mouans Sartoux (FR); Jean-Philippe Vasseur, Anchorage, AK (US); Eric Michel Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 3 days.

(21) Appl. No.: 14/950,459

(22) Filed: Nov. 24, 2015

(51) Int. Cl.
*H04B 1/713* (2011.01)
*H04B 1/7143* (2011.01)
*H04W 72/04* (2009.01)

(52) U.S. Cl.
CPC ...... *H04B 1/7143* (2013.01); *H04W 72/0453* (2013.01)

(58) Field of Classification Search
CPC .............. H04B 1/7143; H04W 72/0453; H04J 13/0074
See application file for complete search history.

(56) References Cited

U.S. PATENT DOCUMENTS

| 7,266,141 | B2 | 9/2007 | Goodings | |
|---|---|---|---|---|
| 8,098,711 | B2 | 1/2012 | Palanki et al. | |
| 8,358,678 | B2 * | 1/2013 | Eriksson | H04B 1/7143 375/133 |
| 2005/0058181 | A1 * | 3/2005 | Lyle | H04B 1/715 375/133 |
| 2013/0094537 | A1 * | 4/2013 | Hui | H04B 1/713 375/134 |

(Continued)

FOREIGN PATENT DOCUMENTS

CN 103944606 A 7/2014

OTHER PUBLICATIONS

Vilajosana, Ed., et al., "Minimal 6TiSCH Configuration", [online], 6TiSCH Internet Draft, Sep. 21, 2015, [retrieved on Oct. 20, 2015]. Retrieved from the Internet: <URL: https://tools.ietf.org/pdf/draft-ietf-6tisch-minimal-12.pdf>, pp. 1-25.
Thubert, Ed., "6TiSCH requirements for DetNet", [online], 6TiSCH Internet Draft, Jun. 4, 2015, [retrieved on Oct. 20, 2015]. Retrieved from the Internet: <URL: https://tools.ietf.org/pdf/draft-thubert-6tisch-4detnet-00.pdf>, pp. 1-19.

(Continued)

*Primary Examiner* — Dac Ha
(74) *Attorney, Agent, or Firm* — Leon R. Turkevich

(57) ABSTRACT

In one embodiment, a method comprises: allocating, to each network device in a time slotted channel hopping network, a corresponding swapping schedule that maps the network device to different unique sequence offsets for different timeslots allocated to the corresponding network device, each unique sequence offset identifying a corresponding shifted position in a prescribed repeating channel hopping sequence relative to an epochal start of a linearly increasing timeslot value; and causing each network device to transmit according to its corresponding swapping schedule, enabling a channel hopping sequence of each network device to be undetectable relative to the prescribed repeating channel hopping sequence.

20 Claims, 8 Drawing Sheets

(56) References Cited

U.S. PATENT DOCUMENTS

| | | | | |
|---|---|---|---|---|
| 2014/0078972 A1* | 3/2014 | Sorrentino | ......... | H04J 13/0074 |
| | | | | 370/329 |
| 2016/0020822 A1* | 1/2016 | Li | ......... | H04B 1/715 |
| | | | | 375/133 |
| 2016/0254839 A1* | 9/2016 | Dahlman | ......... | H04B 1/59 |
| | | | | 375/132 |

OTHER PUBLICATIONS

Watteyne, Ed., et al., "Using IEEE 802.15.4e Time-Slotted Channel Hopping (TSCH in the Internet of Things (IoT): Problem Statement", Internet Engineering Task Force Request for Comments: 7554, May 2015, pp. 1-23.

Thubert, et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

Thubert, et al., U.S. Appl. No. 14/642,066, filed Mar. 9, 2015.

Thubert, et al., U.S. Appl. No. 14/873,292, filed Oct. 2, 2015.

Partial Translation of Published Application CN 103944606A, "Self-adaptation frequency hopping pattern generation method |Produce [sic] one method a frequency hopping pattern of self-adaptation", Thomson Reuters, Aug. 19, 2015, pp. 1-3.

Orr, "Quasi-independent frequency hopping—A new spread spectrum multiple access technique" (Abstract) [online], 1981, [retrieved on May 18, 2016]. Retrieved from the Internet: <URL: http://adsabs.harvard.edu/abs/1981icc...4...76O>, 2 pages.

* cited by examiner

FIG. 1B

DEFAULT TSCH SEQUENCE,

34a → A = 2, 13, 3,.....

34b → B = 7, 15, 4,.....

34c → C = 10, 5, 6,.....

34d → D = 13, 3, 9,.....

CHANNEL HOPPING SEQUENCE USING SWAPPING SCHEDULE,

HIDDEN CHANNEL HOPPING SEQUENCE BASED ON SWAPPING SEQUENCE OFFSETS USING ALLOCATED SWAPPING SCHEDULE

TECHNICAL FIELD

The present disclosure generally relates to a network device using a hidden channel hopping sequence based on swapping sequence offsets using an allocated swapping schedule.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal frame loss). For example, Low power and Lossy Networks (LLNs) allow a large number (e.g., tens of thousands) of resource-constrained devices to be interconnected to form a wireless mesh network. The IETF has proposed a routing protocol ("6TiSCH") that provides IPv6 routing using time slotted channel hopping (TSCH) based on IEEE 802.15.4e, enabling LLN devices to use low-power operation and channel hopping for higher reliability. The 6TiSCH architecture specifies a Channel distribution/usage (CDU) matrix of "cells", each cell representing a unique wireless channel at a unique timeslot following an initial epochal time (T=0).

Hence, a TSCH schedule can be allocated to a network device based on broadcast of a beacon message, where a network device can identify a prescribed allocated channel hopping sequence based on receiving a unique sequence offset that identifies a shifted position within a repeating (i.e., circular) default channel hopping sequence, relative to a timeslot value (e.g., an Absolute Slot Number (ASN)).

BRIEF DESCRIPTION OF THE DRAWINGS

Reference is made to the attached drawings, wherein elements having the same reference numeral designations represent like elements throughout and wherein:

FIGS. 1A, 1B, and 1C summarize an example time slotted channel hopping data network having an apparatus for generating undetectable channel hopping sequences for network devices, based on allocating swapping schedules that map to different sequence offsets in a prescribed repeating channel hopping sequence, according to an example embodiment.

FIG. 2 illustrates channel hopping sequences generated based on allocated swapping schedules and undetectable relative to a prescribed repeating channel hopping sequence, according to an example embodiment.

DESCRIPTION OF EXAMPLE EMBODIMENTS

Overview

Figure 1A:
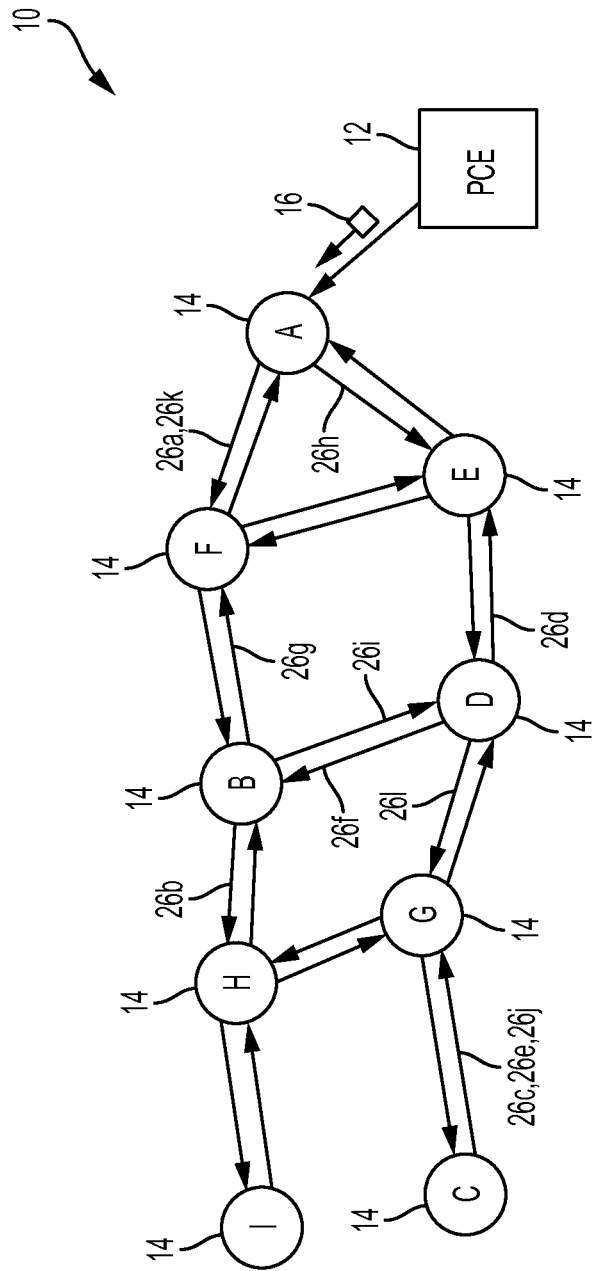

In one embodiment, a method comprises: allocating, to each network device in a time slotted channel hopping network, a corresponding swapping schedule that maps the network device to different unique sequence offsets for different timeslots allocated to the corresponding network device, each unique sequence offset identifying a corresponding shifted position in a prescribed repeating channel hopping sequence relative to an epochal start of a linearly increasing timeslot value; and causing each network device to transmit according to its corresponding swapping schedule, enabling a channel hopping sequence of each network device to be undetectable relative to the prescribed repeating channel hopping sequence.

In another embodiment, an apparatus comprises a processor circuit and a device interface circuit. The processor circuit is configured for allocating, to each network device in a time slotted channel hopping network, a corresponding swapping schedule that maps the network device to different unique sequence offsets for different timeslots allocated to the corresponding network device. Each unique sequence offset identifies a corresponding shifted position in a prescribed repeating channel hopping sequence relative to an epochal start of a linearly increasing timeslot value. The device interface circuit is configured for causing each network device to transmit according to its corresponding swapping schedule, enabling a channel hopping sequence of each network device to be undetectable relative to the prescribed repeating channel hopping sequence.

In another embodiment, one or more non-transitory tangible media are encoded with logic for execution by a machine. The one or more non-transitory tangible media encoded with the logic, when executed by the machine, is operable for: allocating, to each network device in a time slotted channel hopping network, a corresponding swapping schedule that maps the network device to different unique sequence offsets for different timeslots allocated to the corresponding network device, each unique sequence offset identifying a corresponding shifted position in a prescribed repeating channel hopping sequence relative to an epochal start of a linearly increasing timeslot value; and causing each network device to transmit according to its corresponding swapping schedule, enabling a channel hopping sequence of each network device to be undetectable relative to the prescribed repeating channel hopping sequence.

DETAILED DESCRIPTION

Particular embodiments provide allocated swapping schedules that enable network devices in a time slotted channel hopping (TSCH) network to "hide" their allocated channel hopping sequence from any observer (e.g., a "rogue" network device) that might attempt to exploit the TSCH network by detecting a pattern identifying a shifted position within a prescribed repeating (default) channel hopping sequence. In particular, each network device uses its allocated swapping schedule to establish a channel hopping sequence that is distinct from any pattern in the prescribed repeating channel hopping sequence, preventing any detection of any pattern in the channel hopping sequence that could be exploited for future transmissions.

Figure 1B:
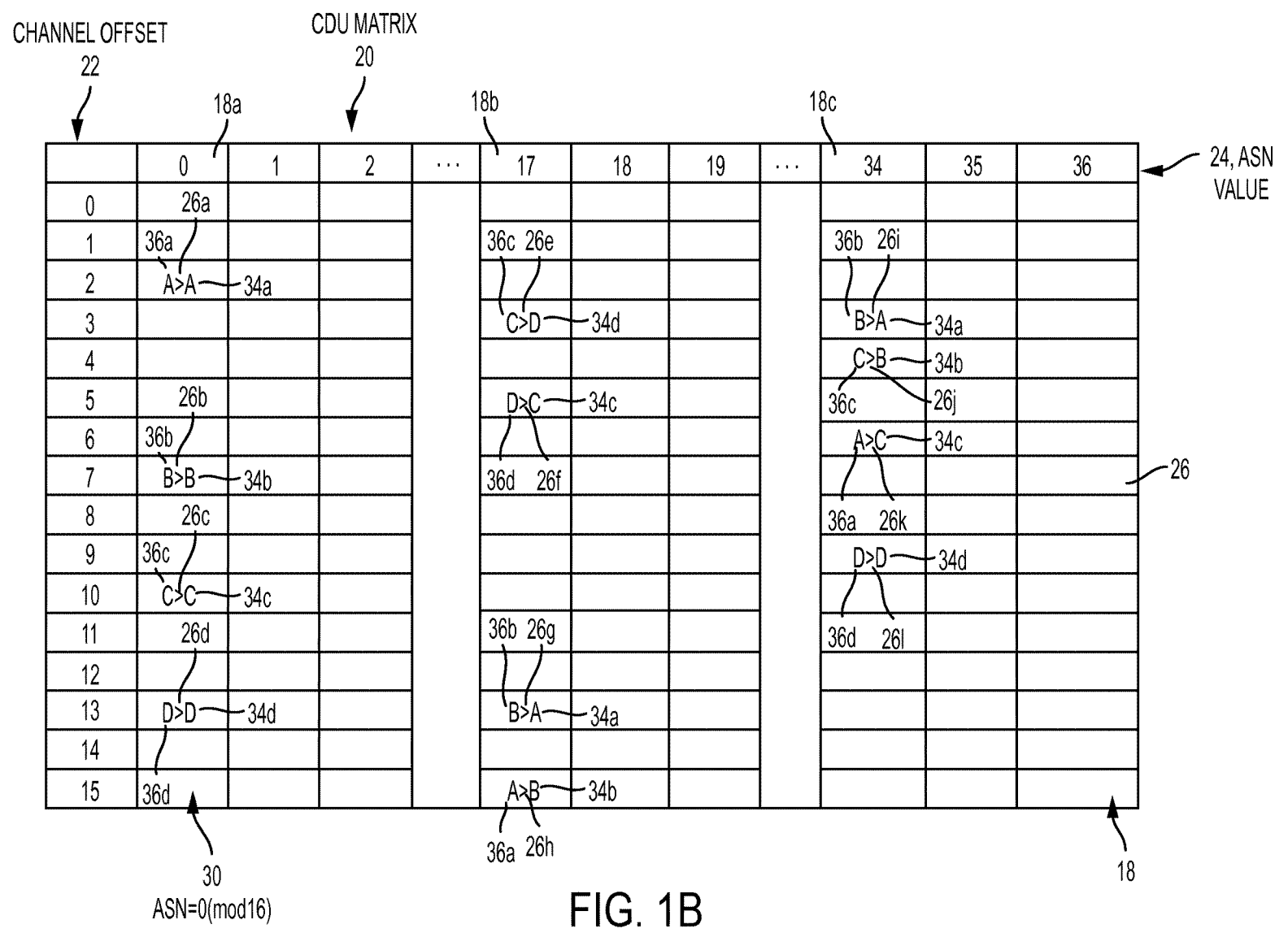
Figure 1C:
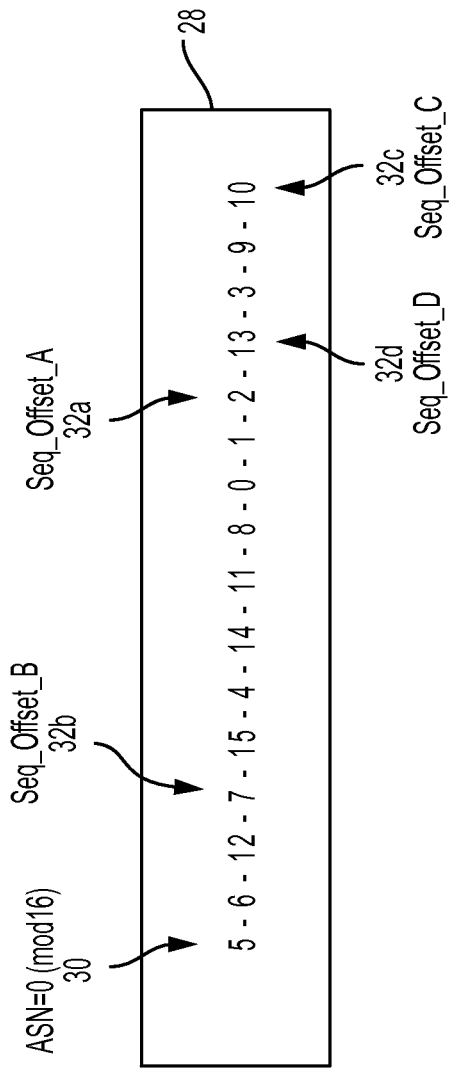

FIGS. 1A, 1B, and 1C summarize an example time slotted channel hopping data network having an apparatus for generating undetectable channel hopping sequences for network devices, based on allocating swapping schedules that map to different sequence offsets in a prescribed repeating channel hopping sequence, according to an example embodiment. FIG. 1A illustrates an example wireless data network 10 comprising an apparatus 12 configured for generating, for each network device 14 (e.g., network devices "A", "B", "C", "D", etc.), a corresponding swapping schedule 16 that maps the corresponding network device 14 to different unique sequence offsets for different timeslots 18 allocated to the corresponding network device 14, according to an example embodiment. The apparatus 12, implemented for example as a centralized path computation element (PCE) in a TSCH network, can establish a channel distribution/usage (CDU) matrix 20 that establishes a transmission schedule and a channel hopping sequence.

FIG. 1B illustrates a CDU matrix 20 that comprises numerous "cells" 26, each cell representing a unique wireless channel (identified by a frequency channel offset 22) at a unique timeslot 18 (identified by an Absolute Slot Number (ASN) value 24) following an initial epochal time (T=ASN=0). Hence, the timeslot 18a represents the "beginning" of the TSCH network at the initial epochal time (ASN=0), with successive timeslots having successively increasing ASN values 24, also referred to as linearly increasing timeslot values or linearly increasing timeslot offset values; the timeslot 18b has the ASN value ASN=17, and the timeslot value 18c has the ASN value ASN=34.

Hence, each two-dimensional cell 26 is defined by a corresponding unique timeslot offset value 24 and a corresponding unique channel offset value 22; for example, the cell 26a has a corresponding exclusive timeslot offset (ASN=0) value 24 and corresponding exclusive channel offset value (Ch_Offset="2") 22; the cell 26b has a corresponding exclusive timeslot offset (ASN=0) value 24 and corresponding exclusive channel offset value (Ch_Offset="7") 22; the cell 26c has a corresponding exclusive timeslot offset (ASN=0) value 24 and corresponding exclusive channel offset value (Ch_Offset="10") 22; and the cell 26d has a corresponding exclusive timeslot offset (ASN=0) value 24 and corresponding exclusive channel offset value (Ch_Offset="13") 22.

Similarly, at timeslot 18b (having the exclusive timeslot offset (ASN=17) value 24), the cells 26e, 26f, 26g, and 26h have the respective exclusive channel offset values "3", "5", "13", and "15" 22; at timeslot 18c (having the exclusive timeslot offset (ASN=34) value 24, the cells 26i, 26j, 26k, and 26l have the respective exclusive channel offset values "3", "4", "6", and "9" 22.

Hence, the PCE 12 allocates to each transmitting network device 14 a unique "cell" 26 having a corresponding exclusive frequency channel 22 and a corresponding exclusive time slot 18: only the transmitting network device (e.g., "A") 14 allocated the cell 26a can transmit at the exclusive timeslot offset (ASN=0) 24 and the exclusive channel offset (Ch_Offset="2") 22 associated with the cell 26a, and only a receiving network device (e.g., "F") 14 associated with receiving the data packet from the transmitting network device ("A") 14 (e.g., based on unicast reception) can acknowledge the transmitted data packet during the allocated cell 26a.

FIG. 1C illustrates a prescribed repeating channel hopping sequence 28 and static device-allocated sequence offsets 32. One method for allocating unique cells 26 in FIG. 1B can include allocating a static (i.e., unchanging) sequence offset (32 of FIG. 1C) that identifies a shifted position within the prescribed repeating channel hopping sequence 28 specifying all of the channel offset values 22 in a prescribed order, relative to the epochal start (T=ASN=0) 30 of the linearly increasing timeslot values 24. As illustrated in FIG. 1C, the prescribed repeating channel hopping sequence 28 is composed of the sequence of sixteen (16) channel offset values "5-6-12-7-15-4-14-11-8-0-1-2-13-3-9-10". The first channel offset value "5" 22 in the prescribed repeating channel hopping sequence 28 corresponds to the epochal start 30 at the timeslot 18a of FIG. 1B, the second successive channel offset value "6" 22 in the prescribed repeating channel hopping sequence 28 corresponds to the next timeslot 18 having the linearly increasing timeslot value "ASN=1" for the next successive timeslot 18, etc., until the last channel offset value "10" 22 in the prescribed repeating channel hopping sequence 28 which corresponds to the timeslot value "ASN=15" 24. The prescribed repeating channel hopping sequence 28 is repeated after the timeslot 18 having the timeslot value "ASN=15" 24, such that the next successive timeslot 18 at the next successively increasing timeslot value "ASN=16" has the first channel offset value "5" 22, the next successive timeslot 18b having the timeslot value "ASN=17" has the second channel offset value "6" 22, etc.

Hence, the prescribed repeating channel hopping sequence 28 can be repeated indefinitely, such that the channel offset value 22 can be determined based on the ASN value 24 relative to the modulus of the number "n" of frequency channels in use in the prescribed repeating channel hopping sequence 28. In other words, assuming no sequence offset (described below), the channel offset "Freq_m" to be used by a given network device "m" for transmitting at a given timeslot (identified by its corresponding ASN value 24) from the prescribed repeating channel hopping sequence 28 specifying "n" distinct channels is identifiable by the function "Freq_m=F[mod_nFreq(ASN)]", where "mod_nFreq" specifies the modulus for "n" distinct frequency channels; since the prescribed repeating channel hopping sequence 28 illustrates sixteen (16) distinct frequency channel offset values 22 (n=16), the channel offset "Freq_m" to be used by a network device having zero sequence offset is "Freq_m=F[mod 16(ASN)]".

The PCE 12 can assign, to each network device 14, a corresponding static device-allocated sequence offset 32 that causes the network device 14 to shift its position within the prescribed repeating channel hopping sequence 28 relative to the epochal start 30 to obtain a unique cell 26. For example, in response to the PCE 12 allocating the static device-allocated sequence offset (Seq_Offset_A=11) 32a to the network device "A" 14, the network device "A" begins tracking its channel hopping sequence (at timeslot 18a) at the channel offset value "2" 22 based on shifting from the start position "5" of the prescribed repeating channel hopping sequence 28 at the epochal start 30 relative to the corresponding static device-allocated sequence offset (Seq_Offset_A=11) 32a; in response to the PCE 12 allocating the static device-allocated sequence offset (Seq_Offset_B=3) 32b to the network device "B" 14, the network device "B" begins tracking its channel hopping sequence (at timeslot 18*a*) at the channel offset value "7" 22; in response to the PCE 12 allocating the static device-allocated sequence offset 32*c* to the network device "C" 14, the network device "C" begins tracking its channel hopping sequence (at timeslot 18*a*) at the channel offset value "10" 22; in response to the PCE 12 allocating the static device-allocated sequence offset 32*d* to the network device "D" 14, the network device "D" begins tracking its channel hopping sequence (at timeslot 18*a*) at the channel offset value "13" 22.

Hence, the assignment of static device-allocated sequence offsets 32 result in the default TSCH sequence 34, illustrated in FIG. 2, where the network device "A" starts at the epochal start 30 with the default channel hopping sequence "2, 13, 3, . . . " 34*a*, the network device "B" starts at the epochal start 30 with the default channel hopping sequence "7, 15, 4, . . . " 34*b*, the network device "C" starts at the epochal start 30 with the default channel hopping sequence "10, 5, 6, . . . " 34*c*, and the network device "D" starts at the epochal start 30 with the default channel hopping sequence "13, 3, 9, . . . " 34*b*.

Figure 3:
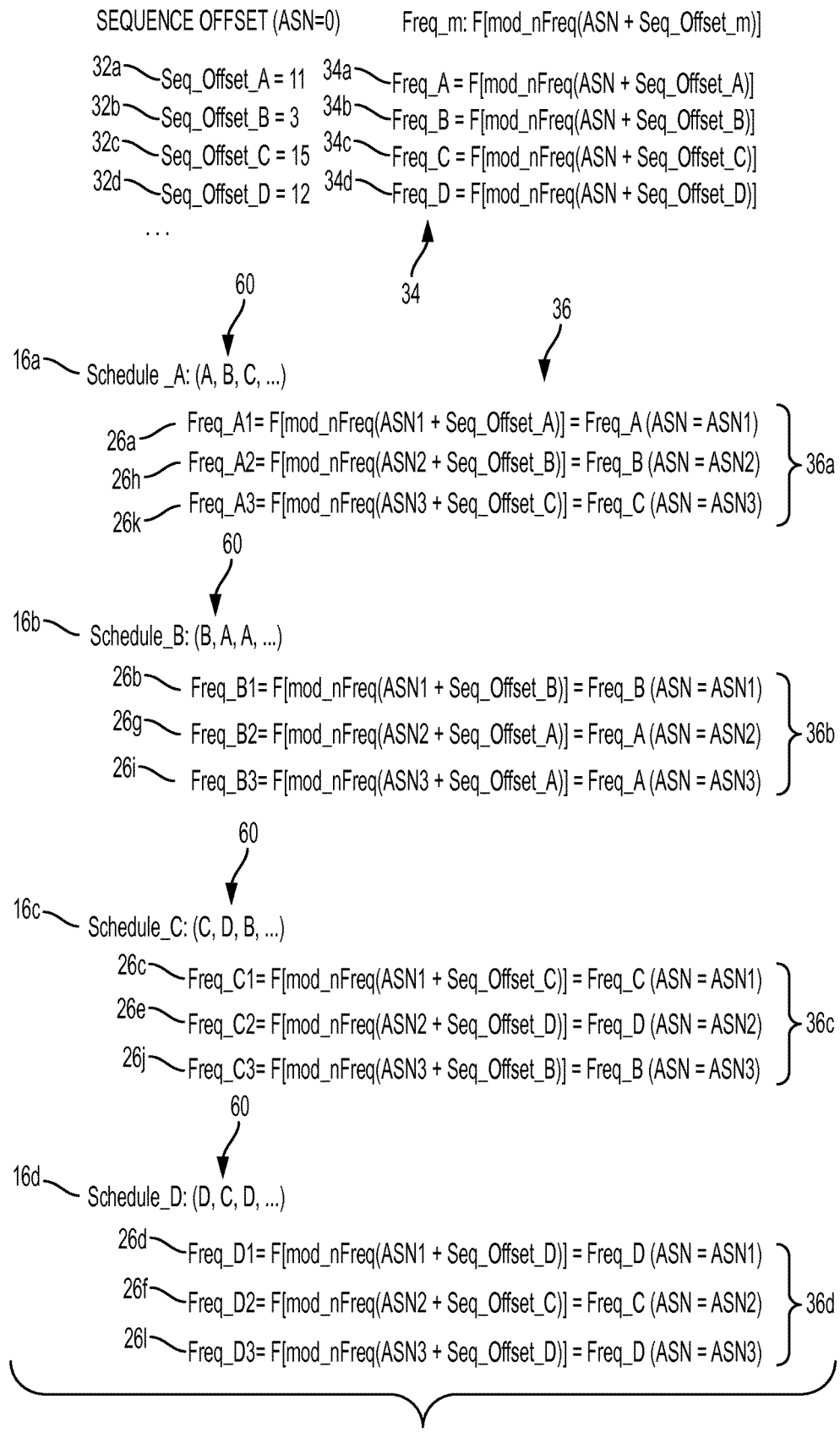
FIG. 3 illustrates network devices determining undetectable channel hopping sequences based on allocated swapping schedules specifying node identities and device-allocated sequence offsets, according to an example embodiment.

As apparent from the foregoing and as illustrated in FIG. 3, each of the default channel hopping sequences 34*a*, 34*b*, 34*c*, and 34*d* follow the pattern in the prescribed repeating channel hopping sequence 28, shifted by the respective static device-allocated sequence offsets 32*a*, 32*b*, 32*c*, and 32*d*. Hence, any rogue network device could detect the default channel hopping sequence 34 based on knowledge of the prescribed repeating channel hopping sequence 28, and based on monitoring the frequency transmissions used by the network device 14 to determine the corresponding static device-allocated sequence offset 32 in use by the network device. Hence, a rogue network device could exploit the known pattern of the prescribed repeating channel hopping sequence 28 to determine the static device-allocated sequence offset 32 of a network device 14 and predict the next cell 26 allocated to the network device 14.

According to an example embodiment, the PCE 12 allocates, to each network device 14, a corresponding unique swapping schedule 16 that maps the network device 14 to different unique sequence offsets for different timeslots 18 allocated to the corresponding network device; in other words, the swapping schedule 16 ensures that a network device 14 does not rely solely on the corresponding static device-allocated sequence offset 32 to generate the corresponding default channel hopping sequence 34 for each transmission relative to the prescribed repeating channel hopping sequence 28, rather the swapping schedule 16 ensures that the network device 14 uses different sequence offset values to ensure that the channel hopping sequence 36 used by the network device 14 is distinct from any pattern in the prescribed repeating channel hopping sequence 28.

FIG. 3 illustrates network devices 14 generating undetectable channel hopping sequences based on allocated swapping schedules 16, according to an example embodiment. As illustrated in FIGS. 1A, 1B, 2, and 3, the swapping schedule 16*a* allocated by the PCE 12 to the network device "A" 14 causes the network device "A" 14 to use the hidden channel hopping sequence "2, 15, 6" 36*a* at respective timeslots 18*a* (ASN=0), 18*b* (ASN=17=1 (modulo 16)), and 18*c* (ASN=34=2 (modulo 16)). Similarly, the swapping schedule 16*b* allocated by the PCE 12 to the network device "B" 14 causes the network device "B" 14 to use the hidden channel hopping sequence "7, 13, 3" 36*b* at respective timeslots 18*a*, 18*b*, and 18*c*; the swapping schedule 16*c* allocated by the PCE 12 to the network device "C" 14 causes the network device "C" 14 to use the hidden channel hopping sequence "10, 3, 4" 36*c* at respective timeslots 18*a*, 18*b*, and 18*c*; and the swapping schedule 16*d* allocated by the PCE 12 to the network device "D" 14 causes the network device "D" 14 to use the hidden channel hopping sequence "13, 5, 9" 36*d* at respective timeslots 18*a*, 18*b*, and 18*c*.

Hence, the swapping schedules 16*a*, 16*b*, 16*c*, and 16*d* allocated by the PCE 12 cause the respective network devices "A", "B", "C", and "D" 14 to generate the respective hidden channel hopping sequences 36*a*, 36*b*, 36*c*, and 36*d* that are distinct from any pattern in the prescribed repeating channel hopping sequence 28. Hence, the channel hopping sequences 36 are undetectable relative to the prescribed repeating channel hopping sequence 28 because any rogue network device cannot predict the next cell 26 to be used by any network device 14.

As described in further detail below, the swapping schedule 16 can be implemented using two example forms: (1) a swapping schedule based on specifying, for each timeslot allocated to the corresponding network device, a device identity of one of the network devices, enabling a network device to generate its hidden channel hopping sequence 36 based on using the static device-allocated sequence offset 32 of another identified network device ("device identity swapping"); or (2) a swapping schedule based on specifying, for the timeslots allocated to the corresponding network device, two or more different sequence offset values that cause the corresponding network device 14 to establish the corresponding hidden channel hopping sequence 36 based on the different sequence offset values.

Figure 4:
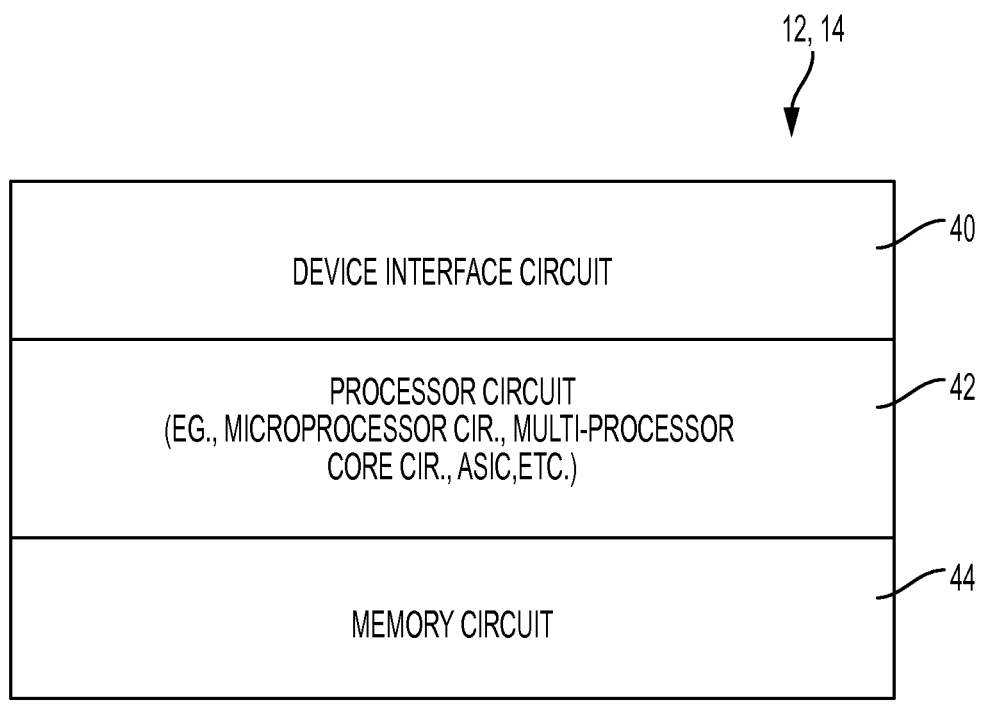
FIG. 4 illustrates an example implementation of any one of the network devices of FIG. 1A, according to an example embodiment.

FIG. 4 illustrates an example implementation of any one of the devices 12, 14 of FIG. 1A, according to an example embodiment. Each apparatus 12, 14 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation.

Each apparatus 12 and/or 14 can include a device interface circuit 40, a processor circuit 42, and a memory circuit 44. The device interface circuit 40 can include one or more distinct IEEE based transceivers for communications with the devices of FIG. 1A via any of the wireless data links shown in FIG. 1A. The device interface circuit 40 can include one or more physical layer transceiver circuits, one or more MAC layer circuits 36, etc. and can configured for executing TSCH (e.g., 6TiSCH) based communications with one or more other device 12 and/or 14.

The processor circuit 42 can be configured for executing any of the operations described herein, and the memory circuit 44 can be configured for storing any data structures (e.g., the prescribed repeating channel hopping sequence 28, the corresponding allocated swapping schedule 16, the corresponding hidden channel hopping sequence 36, etc.) or data frames as described herein. Any of the data structures or data frames described herein also can be stored in an internal memory circuit within the device interface circuit 40.

Any of the disclosed circuits of the devices 12 and/or 14 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a frame" (or the like) can be implemented based on creating the message/frame in the form of a data structure and storing that data structure in a non-transitory tangible memory medium in the disclosed apparatus (e.g., in a transmit buffer). Any reference to "outputting a message" or "outputting a frame" (or the like) also can include electrically transmitting (e.g., via wired electric current or wireless electric field, as appropriate) the message/frame stored in the non-transitory tangible memory medium to another network node via a communications medium (e.g., a wired or wireless link, as appropriate) (optical transmission also can be used, as appropriate). Similarly, any reference to "receiving a message" or "receiving a frame" (or the like) can be implemented based on the disclosed apparatus detecting the electrical (or optical) transmission of the message/frame on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 5:
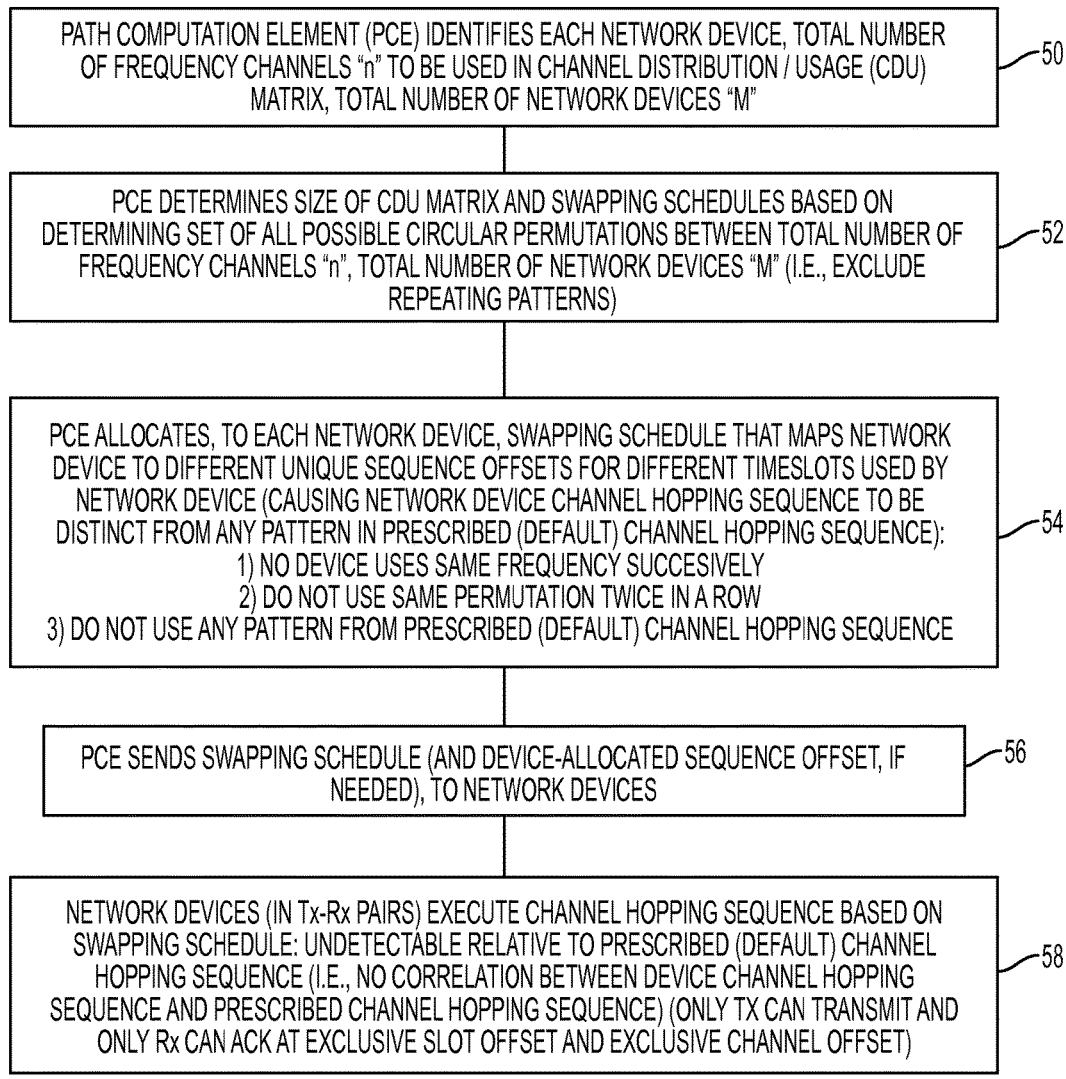
FIG. 5 illustrates an example method of generating undetectable channel hopping sequences based on allocating swapping schedules, according to an example embodiment.
Figure 6A:
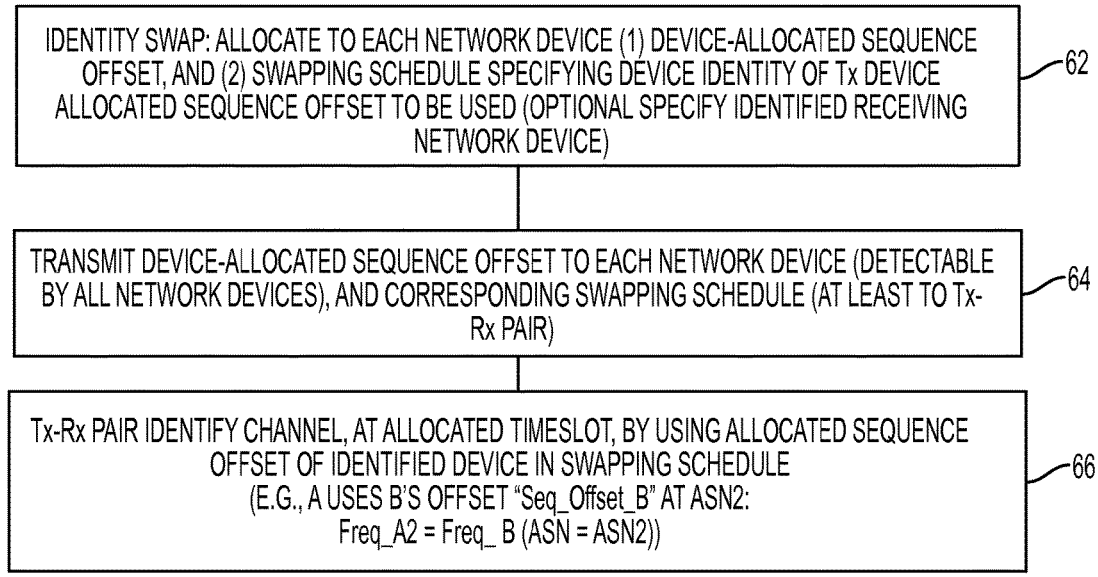
FIGS. 6A and 6B illustrate allocation of example swapping schedules to network devices for transmission using undetectable channel hopping sequences, according to an example embodiment.
Figure 6B:
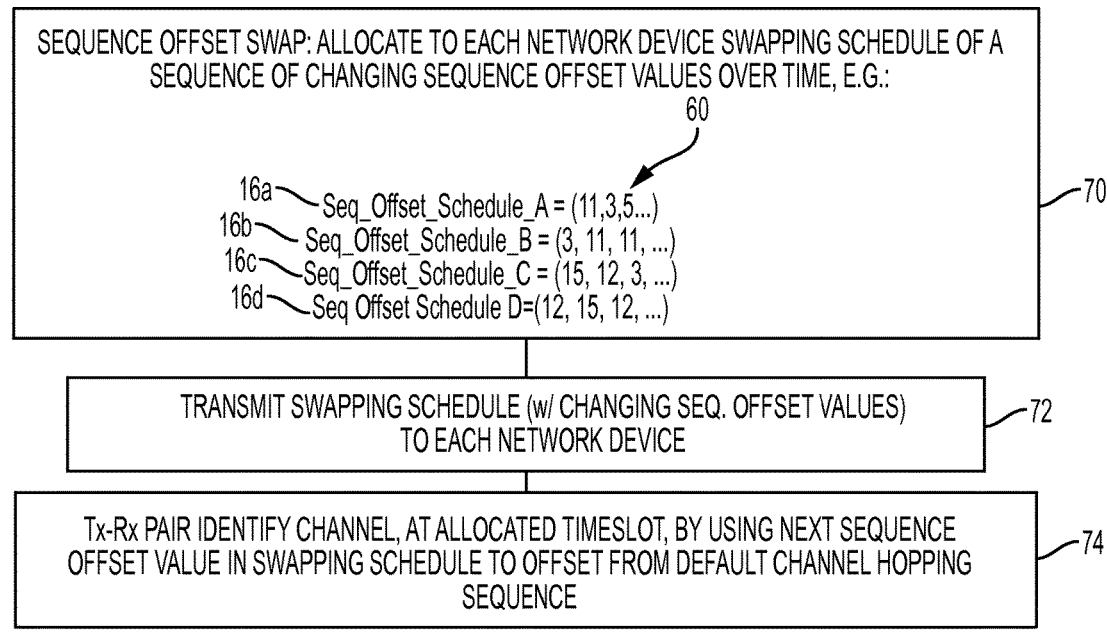

FIG. 5 illustrates an example method of generating undetectable channel hopping sequences based on allocating swapping schedules, according to an example embodiment. FIGS. 6A and 6B illustrate example allocation of swapping schedules to network devices for transmission using undetectable channel hopping sequences, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 5, the processor circuit 42 of the PCE 12 in operation 50 is configured to identify each network device 14 (e.g., "A", "B", . . . "H", "I", etc.) in the wireless data network 10 that is to be allocated a cell 26 in the CDU matrix 20. In response to identifying each of the network devices 14, the processor circuit 42 of the PCE 12 in operation 50 is configured to identify the total number of network devices "M", and the total number of frequency channels "n" to be used in the CDU matrix 20.

The processor circuit 42 of the PCE 12 in operation 52 is configured for determining the size of the CDU matrix 20 (including the number of timeslots 18 in the CDU matrix 20) based on the number of all possible circular permutations between the number of the total number of network devices "M" relative to the number "n" of available frequency channels; the term "circular permutations" refers to the number of unique permutations (Pj) of a group (j) of identified network devices 14 that do result in any repeating pattern, such that Pj=(j−1)! (i.e., using a factorial ("!") of "j−1") identifies the number of unique patterns for the group "j". Hence, the PCE 12 excludes in operation 52 any repeating pattern from consideration in the CDU matrix 20.

The processor circuit 42 of the PCE 12 in operation 54 allocates, to each network device 14, a corresponding swapping schedule 16 that maps the corresponding network device 14 to different unique sequence offsets for different timeslots 18 allocated to the network device 14; as described previously with respect to FIG. 2, the swapping schedule 16 causes the hidden channel hopping sequence 36 to be distinct from any pattern in the prescribed repeating channel hopping sequence 28. The processor circuit 42 of the PCE 12 can allocate the swapping schedules 16 based on the following example rules: (1) no network device 14 uses the same frequency channel (i.e., channel offset value 22) successively; (2) no permutation (from the circular permutation) is used twice in a row; and (3) do not use any pattern from the prescribed repeating channel hopping sequence 28.

Following generation of the swapping schedules 16 for the respective network devices 14, the device interface circuit 40 of the PCE 12 in operation 56 is configured for sending the allocated swapping schedules 16 the respective network devices 14. As described in further detail below with respect to FIG. 6A, the device interface circuit 40 of the PCE 12 also can send to a network device 14 the static device-allocated sequence offsets 32 of each network device 14 identified in the corresponding network device 14 if the swapping schedule 16 specifies multiple device identities that cause the network device 14 to assume the identity of the network device 14 specified in the swapping schedule 16.

In response to each network device 14 receiving its corresponding swapping schedule 16, the network devices in transmit (Tx)-receive (Rx) pairs in operation 58 execute the hidden channel hopping sequence 36 based on the received swapping schedule 16. As illustrated in FIGS. 1A, 1B, 2, and 3, the network device "A" 14 can execute the hidden channel hopping sequence 36a at the allocated timeslots (e.g. the cells 26a, 26h, 26k, . . . ) based on the received swapping schedule 16a, where the network device "A" 14 transmits to the receiving network device "F" 14 using cells 26a and 26k, and the network device "A" transmits to the receiving network device "E" 14 using cell 26h. The network device "B" 14 can execute the hidden channel hopping sequence 36b at the allocated timeslots (e.g. the cells 26b, 26g, 26i, . . . ) based on the received swapping schedule 16b, where the network device "B" 14 transmits to the receiving network devices "H", "F", and "D" using cells 26b, 26g, and 26i, respectively. The network device "C" 14 can execute the hidden channel hopping sequence 36c at the allocated timeslots (e.g. the cells 26c, 26e, 26j, . . . ) based on the received swapping schedule 16c, where the network device "C" 14 transmits to the receiving network device "G" using cells 26c, 26e, and 26j. The network device "D" 14 executes the hidden channel hopping sequence 36d at the allocated timeslots (e.g. the cells 26d, 26f, 26l, . . . ) based on the received swapping schedule 16d, where the network device "D" 14 transmits to the receiving network devices "E", "B", and "G" using cells 26d, 26f, and 26l, respectively. Hence, only the transmitting network device (e.g., network device "A" 14) can transmit and only the corresponding identified receiving network device (e.g., network device "F" 14) can acknowledge at the corresponding exclusive slot offset and exclusive channel offset (e.g., timeslot 18a and channel offset "2" identified by the cell 26a) as identified by the corresponding swapping schedule 16a relative to the linearly increasing timeslot value.

The PCE 12 can repeat the operations of FIG. 5 to generate a new CDU matrix 20 (and associated swapping schedules 16) before the end of the existing CDU matrix, namely before the current network timeslot 18 reaches the last ASN value 24 specified in the existing CDU matrix 20.

FIGS. 6A and 6B illustrate example allocation of swapping schedules 16 to network devices 14 for transmission using undetectable (hidden) channel hopping sequences 36, according to an example embodiment. FIG. 6A illustrates a first example swapping schedule (e.g., 16a, 16b, 16c, and/or 16d of FIG. 3) that specifies device identities (60 of FIG. 3), where the network device 14 uses the static device-allocated sequence offset 32 of the identified device specified in the swapping schedule (e.g., 16a), for the appropriate timeslot, to determine the channel offset 22 to be used. In other words, the network device 14 executes an "identity swap" to use the static device-allocated sequence offset 32 of another network device 14: the "identity swap" is illustrated in FIG. 1B in the cells 26 in the form "y>x", where the identity of node "x" is used by node "y" to use the cell 26 originally allocated to node "x", i.e., node "y" uses (">") the identity of node "x".

Referring to FIG. 6A, the processor circuit 42 of the PCE 12 in operation 62 allocates to each network device the corresponding static device-allocated sequence offset 32, and the swapping schedule 16 (illustrated in FIG. 3) specifying a device identity 60 of a transmitting device "x" that owns the channel offset 22 to be used from the corresponding static device-allocated sequence offset 32 of the device "x"; if necessary, the device identity 60 also can specify a receiving network device identity for the transmitting device "y", resulting in an identification of a transmitter-receiver pair. As illustrated in FIG. 3, the PCE 12 allocates the swapping schedule "Schedule_A" 16a for the network device "A" 14 and specifying the sequence of device identities "A", "B", and "C" to be used by the network device "A" at respective timeslots 18a, 18b, and 18c; the PCE 12 allocates the swapping schedule "Schedule_B" 16b for the network device "B" 14 and specifying the sequence of device identities "B", "A", and "A" to be used by the network device "B" at respective timeslots 18a, 18b, and 18c; the PCE 12 allocates the swapping schedule "Schedule_C" 16c for the network device "C" 14 and specifying the sequence of device identities "C", "D", and "B" to be used by the network device "C" at respective timeslots 18a, 18b, and 18c; and the PCE 12 allocates the swapping schedule "Schedule_D" 16d for the network device "D" 14 and specifying the sequence of device identities "D", "C", and "D" to be used by the network device "A" at respective timeslots 18a, 18b, and 18c.

The device interface circuit 40 of the PCE 12 in operation 64 is configured to transmit (e.g., broadcast) the static device-allocated sequence offset 32 and the corresponding swapping schedule 16 to each network device 14, such that each network device 14 can determine the static device-allocated sequence offset 32 of every other network device identified in its swapping schedule 16.

The swapping schedule 16 enables each transmit-receive (Tx-Rx) pair of network devices 14 in operation 66 to identify the channel offset 22 to be used, at the allocated timeslot, by using the allocated static device-allocated sequence offset 32 of the identified device 14 in the swapping schedule 16. For example, based on the swapping schedule 16a the network device "A" can use its own static device-allocated sequence offset 32a at timeslot 18a, the static device-allocated sequence offset 32b of network device "B" at timeslot 18b, and the static device-allocated sequence offset 32c of network device "C" at timeslot 18c.

Hence, as illustrated in FIG. 1B and FIG. 3 the swapping schedules 16a, 16b, 16c, and 16d cause the network devices "A", "B", "C", and "D" 14 at timeslot 18a to use their own original identities ("A>A"; "B>B"; "C>C"; and "D>D"); the swapping schedules 16a, 16b, 16c, and 16d cause the network devices "A", "B", "C", and "D" 14 at timeslot 18b to use the respective identities "B", "A", "D", "C" ("A>B"; "B>A"; "C>D"; and "D>C"); and the swapping schedules 16a, 16b, 16c, and 16d cause the network devices "A", "B", "C", and "D" 14 at timeslot 18c to use the respective identities "C", "A", "B", "D" ("A>C"; "B>A"; "C>B"; and "D>D").

FIG. 6B illustrates an alternate swapping schedule 16, where each swapping schedule explicitly specifies the sequence offset to be used each allocated timeslot 18. Hence, the processor circuit 42 of the PCE 12 in operation 70 allocates to each network device 14 a swapping schedule 16 specifying a "sequence offset schedule" of changing sequence values over time, where the swapping schedule "Seq_Offset_Schedule_A" 16a for network device "A" specifies the sequence "11, 3, 5, . . . " of sequence offset values applied to the prescribed repeating channel hopping sequence 28 at the corresponding timeslot 18, the swapping schedule "Seq_Offset_Schedule_B" 16b for network device "B" specifies the sequence "13, 11, 11, . . . " of sequence offset values, the swapping schedule "Seq_Offset_Schedule_C" 16c for network device "C" specifies the sequence "15, 12, 3, . . . " of sequence offset values, and the swapping schedule "Seq_Offset_Schedule_D" 16d for network device "D" specifies the sequence "12, 15, 12, . . . " of sequence offset values.

The device interface circuit 40 of the PCE 12 in operation 72 is configured for transmitting the swapping schedule "Seq_Offset_Schedule_y" 16 for each device "y" 14, enabling in operation 74 each transmit-receiver pair to identify the channel offset 22 to be used, at the allocated timeslot 18, by using the next sequence offset value 60 in the corresponding allocated swapping schedule 16, resulting in the same hidden channel hopping sequences 36 illustrated in FIGS. 1A, 1B, and 2.

According to example embodiments, network device security can be maintained in a wireless time slotted channel hopping data network, where wireless network devices use different allocated swapping schedules to use different sequence offset values to ensure that the channel hopping sequence used by the wireless network devices are distinct from any pattern in a prescribed repeating channel hopping sequence.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   allocating, to each network device in a time slotted channel hopping network, a corresponding swapping schedule that maps the network device to different unique sequence offsets for different timeslots allocated to the network device, each unique sequence offset identifying a corresponding shifted position in a prescribed repeating channel hopping sequence relative to an epochal start of a linearly increasing timeslot value; and
   causing each network device to transmit according to its corresponding swapping schedule, enabling a channel hopping sequence of each network device to be undetectable relative to the prescribed repeating channel hopping sequence.

2. The method of claim 1, wherein the allocating comprises:
   second allocating, to each network device, a corresponding unique device-allocated sequence offset relative to the prescribed repeating channel hopping sequence; and
   transmitting the device-allocated sequence offsets and the swapping schedules to respective network devices.

3. The method of claim 2, wherein the swapping schedule specifies, for each timeslot allocated to the corresponding network device, a device identity of one of the network devices, enabling the corresponding network device to determine its channel hopping sequence based on determining, for each allocated timeslot, the device-allocated sequence offset associated with the corresponding device identity specified in the swapping schedule.

4. The method of claim 1, wherein the swapping schedule specifies, for the timeslots allocated to the corresponding network device, two or more different sequence offset values that cause the corresponding network device to establish the corresponding channel hopping sequence to be distinct from any pattern in the prescribed repeating channel hopping sequence.

5. The method of claim 1, wherein the swapping schedule is for transmission between a transmitting network device and an identified receiving network device, the causing including:
   causing said each network device to transmit as a transmitting network device to the identified receiving network device at a corresponding exclusive slot offset and exclusive channel offset identified by the corresponding swapping schedule relative to the linearly increasing timeslot value; and
   the identified receiving network device selectively sending an acknowledgement, to the corresponding transmitting network device, at the corresponding exclusive slot offset and exclusive channel offset identified by the corresponding swapping schedule relative to the linearly increasing timeslot value.

6. The method of claim 5, wherein only the transmitting network device can transmit and only the corresponding identified receiving network device can acknowledge at the corresponding exclusive slot offset and exclusive channel offset identified by the corresponding swapping schedule relative to the linearly increasing timeslot value.

7. The method of claim 1, wherein the allocating comprises:
   identifying a number of frequency channels in use in the prescribed repeating channel hopping sequence;
   identifying a number of the network devices in the time slotted channel hopping network; and
   generating the swapping schedules, for the network devices, based on determining a set of all possible circular permutations between the number of frequency channels and the number of network devices.

8. An apparatus comprising:
   a processor circuit comprising one or more integrated circuits and configured for allocating, to each network device in a time slotted channel hopping network, a corresponding swapping schedule that maps the network device to different unique sequence offsets for different timeslots allocated to the network device, each unique sequence offset identifying a corresponding shifted position in a prescribed repeating channel hopping sequence relative to an epochal start of a linearly increasing timeslot value; and
   a device interface circuit comprising one or more integrated circuits and configured for causing each network device to transmit according to its corresponding swapping schedule, enabling a channel hopping sequence of each network device to be undetectable relative to the prescribed repeating channel hopping sequence.

9. The apparatus of claim 8, wherein:
   the processor circuit is configured for allocating, to each network device, a corresponding unique device-allocated sequence offset relative to the prescribed repeating channel hopping sequence;
   the device interface circuit configured for transmitting the device-allocated sequence offsets and the swapping schedules to respective network devices.

10. The apparatus of claim 9, wherein the swapping schedule generated by the processor circuit specifies, for each timeslot allocated to the corresponding network device, a device identity of one of the network devices, enabling the corresponding network device to determine its channel hopping sequence based on the corresponding network device determining, for each allocated timeslot, the device-allocated sequence offset associated with the corresponding device identity specified in the swapping schedule.

11. The apparatus of claim 8, wherein the swapping schedule specifies, for the timeslots allocated to the corresponding network device, two or more different sequence offset values that cause the corresponding network device to establish the corresponding channel hopping sequence to be distinct from any pattern in the prescribed repeating channel hopping sequence.

12. The apparatus of claim 8, wherein:
the swapping schedule is for transmission between a transmitting network device and an identified receiving network device, the swapping schedule causing said each network device to transmit as a transmitting network device to the corresponding identified receiving network device at a corresponding exclusive slot offset and exclusive channel offset identified by the corresponding swapping schedule relative to the linearly increasing timeslot value; and
the identified receiving network device selectively sending an acknowledgement, to the corresponding transmitting network device, at the corresponding exclusive slot offset and exclusive channel offset identified by the corresponding swapping schedule relative to the linearly increasing timeslot value.

13. The apparatus of claim 12, wherein only the transmitting network device can transmit and only the corresponding identified receiving network device can acknowledge at the corresponding exclusive slot offset and exclusive channel offset identified by the corresponding swapping schedule relative to the linearly increasing timeslot value.

14. The apparatus of claim 8, wherein the processor circuit is configured for allocating the swapping schedules based on:
identifying a number of frequency channels in use in the prescribed repeating channel hopping sequence;
identifying a number of the network devices in the time slotted channel hopping network; and
generating the swapping schedules, for the network devices, based on determining a set of all possible circular permutations between the number of frequency channels and the number of network devices.

15. One or more non-transitory tangible media encoded with logic for execution by a machine and when executed by the machine operable for:
allocating, to each network device in a time slotted channel hopping network, a corresponding swapping schedule that maps the network device to different unique sequence offsets for different timeslots allocated to the network device, each unique sequence offset identifying a corresponding shifted position in a prescribed repeating channel hopping sequence relative to an epochal start of a linearly increasing timeslot value; and
causing each network device to transmit according to its corresponding swapping schedule, enabling a channel hopping sequence of each network device to be undetectable relative to the prescribed repeating channel hopping sequence.

16. The one or more non-transitory tangible media of claim 15, wherein the allocating comprises:
second allocating, to each network device, a corresponding unique device-allocated sequence offset relative to the prescribed repeating channel hopping sequence; and
transmitting the device-allocated sequence offsets and the swapping schedules to respective network devices.

17. The one or more non-transitory tangible media of claim 16, wherein the swapping schedule specifies, for each timeslot allocated to the corresponding network device, a device identity of one of the network devices, enabling the corresponding network device to determine its channel hopping sequence based on determining, for each allocated timeslot, the device-allocated sequence offset associated with the corresponding device identity specified in the swapping schedule.

18. The one or more non-transitory tangible media of claim 15, wherein the swapping schedule specifies, for the timeslots allocated to the corresponding network device, two or more different sequence offset values that cause the corresponding network device to establish the corresponding channel hopping sequence to be distinct from any pattern in the prescribed repeating channel hopping sequence.

19. The one or more non-transitory tangible media of claim 15, wherein the swapping schedule is for transmission between a transmitting network device and an identified receiving network device, the causing including:
causing said each network device to transmit as a transmitting network device to the identified receiving network device at a corresponding exclusive slot offset and exclusive channel offset identified by the corresponding swapping schedule relative to the linearly increasing timeslot value; and
the identified receiving network device selectively sending an acknowledgement, to the corresponding transmitting network device, at the corresponding exclusive slot offset and exclusive channel offset identified by the corresponding swapping schedule relative to the linearly increasing timeslot value.

20. The one or more non-transitory tangible media of claim 19, wherein only the transmitting network device can transmit and only the corresponding identified receiving network device can acknowledge at the corresponding exclusive slot offset and exclusive channel offset identified by the corresponding swapping schedule relative to the linearly increasing timeslot value.

* * * * *